Figure 1:
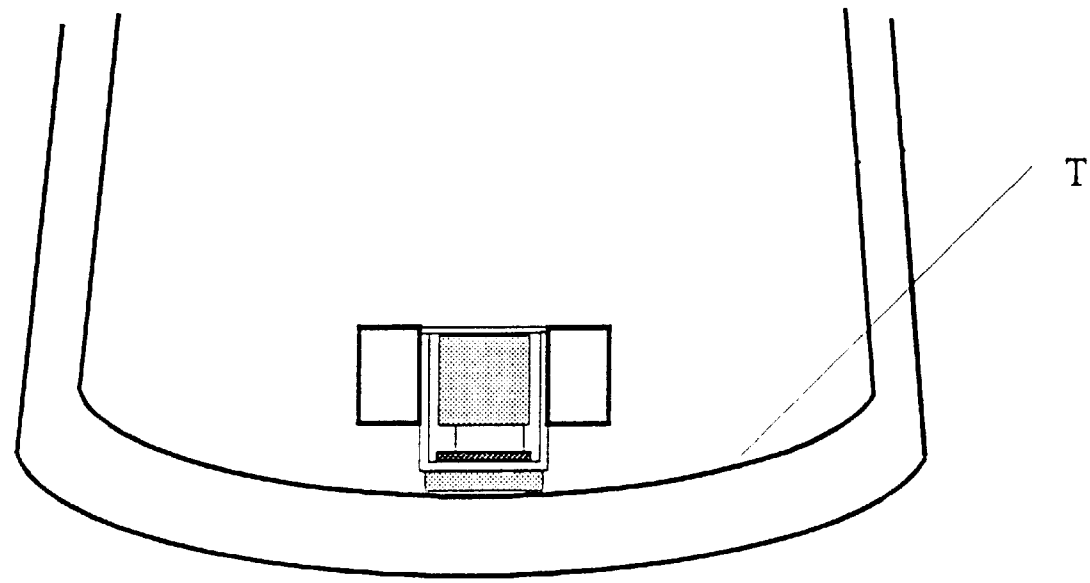

United States Patent [19]
Prottey

[11] Patent Number: 6,105,423
[45] Date of Patent: Aug. 22, 2000

[54] SENSOR FOR A PNEUMATIC TIRE

[75] Inventor: Frederick Vernon Prottey, Burntwood, United Kingdom

[73] Assignee: Sumitomo Rubber Industries Limited, Hyogo-ken, Japan

[21] Appl. No.: 09/210,989

[22] Filed: Dec. 15, 1998

[30]    Foreign Application Priority Data

Dec. 17, 1997  [GB]  United Kingdom .................... 9726594

[51] Int. Cl.[7] ................................................. B60C 23/02
[52] U.S. Cl. .......................................... 73/146.5; 340/442
[58] Field of Search ............................... 73/146.2, 146.3, 73/146.4, 146.5, 146.8; 340/442, 443, 444, 445, 446, 447, 448, 665

[56]             References Cited

U.S. PATENT DOCUMENTS

| 4,067,235 | 1/1978 | Markland et al. | 73/146.5 |
| 5,721,528 | 2/1998 | Boesch et al. | 340/442 |
| 5,877,679 | 3/1999 | Prottery | 340/442 |

FOREIGN PATENT DOCUMENTS

| 4402136A1 | 7/1995 | Germany . |
| 2307044A | 5/1997 | United Kingdom . |

*Primary Examiner*—William Oen
*Assistant Examiner*—Abdullahi Aw-Musse

[57]                 ABSTRACT

A sensor is provided for detecting rotations of a pneumatic tire on a vehicle comprising two spaced apart mounting points for attachment to the radially inner surface of the tire tread region, a contact member between the mounting points for contacting the inner surface of the tread radius of the tire between the two mounting points and signal producing means comprising a piezo-electric device which is adapted to produce a signal when the contact member is moved radially of the tire relative to the two mounting points wherein damping means are provided so that a signal is generated when the movement occurs rapidly but slow movement generates no signal so that on rotation of the tire on a vehicle a signal is produced each time the tread region to which the sensor is attached becomes changed in radius at the contact patch of the tire but when the tread radius changes slowly when there is a pressure change in the tire and the movement is slow no signal is produced.

11 Claims, 1 Drawing Sheet

SENSOR FOR A PNEUMATIC TIRE

The present invention relates to a sensor for a pneumatic tire and particularly to a sensor for detecting rotations of the tire in service and producing an output signal which can be counted to indicate the result.

It has long been an objective in tire and vehicle development to be able to effectively monitor the distance traveled by a tire without needing to rely on the vehicle distance meter.

In co-pending European patent application published as EP-A-0 829 382 there is disclosed a sensor for detecting the rotations of a pneumatic tire on a vehicle comprises a rigid base member, adapted for attachment to the radially inner surface of the tire tread region, at least two spaced-apart mounting links, between said mounting links a force sensing member producing a countable output signal and means for processing said output signal such that on rotation of the tire a force variation is applied to the force sensing member due to the changes in circumferential radius of curvature of the tire tread in the contact to the road. The force measuring member is a force sensitive resistor the resistance of which is monitored by the electronic circuit. It is linked to inside of the tread region by means of a resilient link member.

Sensors of the above type, however, produce signals due to tire inflation pressure and mounting of the sensor to give the desired sensitivity without false signaling is difficult.

It is an object of the present invention to overcome the above problems and provide an improved tire rotation sensor which makes it really practicable to measure the distance covered by a tire.

According to one aspect, the present invention provides a sensor for detecting rotations of a pneumatic tire on a vehicle comprising two spaced apart mounting points for attachment to the radially inner surface of the tire tread region, a contact member between the mounting points for contacting the inner surface of the tire between the two mounting points and signal producing means adapted to produce a signal when the contact member is moved radially of the tire relative to the two mounting points wherein damping means are provided to so that a signal is generated when the movement occurs rapidly but slow movement generates no signal so that on rotation of the tire on a vehicle a signal is produced each time the tread region to which the sensor is attached becomes changed in radius at the contact patch of the tire but when the tread radius changes slowly such as when there is a pressure change in the tire and the movement is slow no signal is produced.

The mounting points may be points on the inner surface of the tire or may be points remote but attached thereto so that the points maintain a fixed relative position with respect to the inner surface.

The signal may be electrical and the damping means may be mechanical or electrical.

Preferably a piezo-electric device is used as the signal producing means. Such devices generate a signal only when the force is applied rapidly and no output is generated when the force is applied slowly such as when the tire tread radius may change as the tire is inflated.

A second aspect of the invention comprises a method of counting the rotations of a pneumatic tire on a vehicle characterized by sensing the changing radius of the tread region using a sensor mounted inside the tire under the tread region having two spaced apart mounting points for attachment and an intermediate contact member which is acted upon by the tire when the tire radius is changed at the ground contact patch and damping means are provided for the sensor so that a signal is generated only when relative movement between the mounting points and the contact member occurs rapidly and not for slow movement so that on rotation of the tire on a vehicle a signal is produced each time the tread region to which the sensor is attached enters the contact patch but when the tread radius changes slowly such as when there is a pressure change such on inflation of the tire the movement is slow and no signal is produced.

Figure 2:
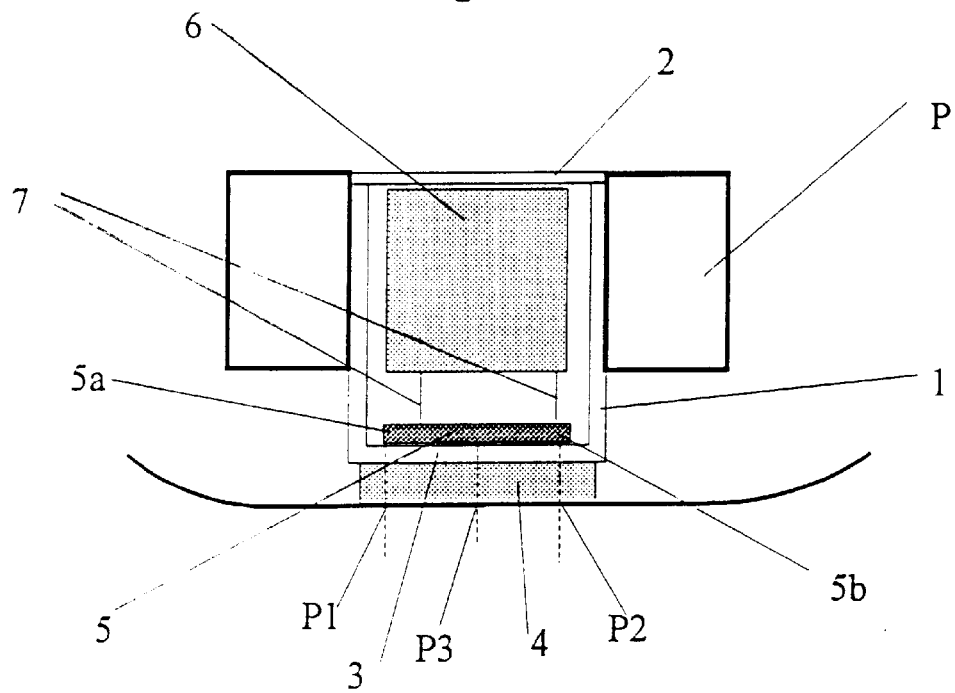

Further aspects of the present invention will be apparent from the following description, by way of example only, of an embodiment of the invention in conjunction the attached diagrammatic drawings in which:

FIG. 1 is a transverse cross section of a tire with a sensor mounted on the inner surface of the tread region; and FIG. 2 is a detailed enlarged view of the sensor of FIG. 1.

The sensor comprises a cylindrical case 1 fitted with a top closure member 2 and having a thin flexible base 3. The sensor dimensions of approximately 20 mm×18 mm diameter. The sensor has around it an electronic pack P which will be explained later. For the present the sensor will be further described.

The sensor 1 is mounted on the inner side T of the tread region of tire. It is preferably mounted on the centerline of the tire tread to ensure that the sensor is midway between the edges of the tread region.

The sensor is attached to the tire by a layer 4 of a suitable adhesive. One such adhesive comprises a one-component medium modulus polyurethane based fast cure adhesive, such as for example SIKAFLEX 221-A available from SIKA Limited. The thickness of the adhesive is chosen so that the fatigue life of the joint is very high bearing in mind that the tire will flex under the sensor many thousands of times in its running life on a vehicle. A suitable thickness for the adhesive is in the range of 2 to 2.5 mm.

Inside the sensor a small bar 5 of piezo electric material is adhered to the upper surface of the base 3. An electrical circuit block 6 is mounted at the top of the sensor and is connected to the piezo electric bar 5 by two wires 7.

The resultant sensor has the sensing element which is the piezo electric material bar 5 effectively fixed at its two ends 5a and 5b. These points are attached through the adhesive to two spaced apart points P1 arid P2 on the inner surface of the tire tread T. The center of the Piezo electric material bar 5 is attached to the center of the base 3 and then to the inner surface of the tire at a point P3 midway between the point P1 and P2. Thus when the tire tread is flattened in the contact patch from its normal curved shape the center of the bar 5 is moved radially inwards with respect to the fixed point at its ends.

The electrical circuit block 6 processes the signal so that an output pulse is produced only for radially inward movement of the contact point.

A suitable sensor is available from Diamond Electronics Ltd., Fourways Technology Park, London Road, Smallwood, Sandbach, Cheshire CW11 2US England as Everswitch Type SMF1—AN.

It is important to note that the bending when the tire tread at the sensor enters the contact patch and is flattened is quite rapid and so an output voltage results. Also no output pulse is produced when the bar 5 is bent back to its original curvature when the sensor part of the tire moves out of the contact patch and then all is reset to await the next rotation of the sensor into the contact patch.

The signal is passed to the electronic pack which is here shown as a ring shaped container. In it a second electronic circuit (not shown)is provided at which comprises a pulse counting unit, a radio transmitter and power supply battery. These allow the number of rotations sensed to be stored and then transmitted to a receiver external to the tire or even external to the vehicle upon which the tire is fitted as required.

The most important feature of the sensor is that the reaction is only to rapid movement. This gives a "damping" effect to the sensor which means that it does not give false rotation signals when for example the tire tread curvature changes due to tire inflation. These produce only slow changes in tire tread radius.

The damping effect can of course be provided by other means including for example the use of the electrical circuit to ignore unwanted signal or even by mechanical means in a force transmission link to the signal generating means.

Also other signal generating means may be utilized in place of the piezo electric material bar.

Accordingly the sensor allows interrogation of the tire as to how many deflections it has gone through and the output may be calibrated in miles or kilometers as required. As will be immediately apparent the total device inside the tire may also include pressure, temperature and other sensors so that a set of data relevant to the particular tire can be transmitted when required.

What is claimed is:

1. A sensor for detecting rotations at the contact patch of a pneumatic tire on a vehicle, comprising (a) two spaced apart mounting points for attachment to the radially inner surface of the tire tread region (b), a contact member between the mounting points for contacting the inner surface of the tread radius of the tire between the two mounting points, and (c) signal producing means comprising a piezo-electric device which is adapted to produce a signal when movement of the contact member occurs radially of the tire relative to the two mounting points wherein damping means are provided so that a signal is generated when the movement occurs rapidly but slow movement generates no signal so that on rotation of the tire on the vehicle a signal is produced each time the tread region to which the sensor is attached becomes changed in radius at the contact patch of the tire but when the tread radius changes slowly when there is a pressure change in the tire and the movement is slow no signal is produced.

2. A sensor according to claim 1, wherein the damping means comprises mechanical means.

3. A sensor according to claim 1, wherein the piezo-electric device comprises means which generates an electrical output when deformed rapidly but substantially no electrical output when deformed slowly.

4. A sensor according to claim 3, wherein the piezo-electric device comprises a rod shaped member mounted between the two mounting points and the contact member acts at the mid point of the rod shaped member.

5. A sensor according to claim 4, wherein the piezo-electrical device generates the output signal only when the rod shaped member moves radially inwards.

6. A tire containing a sensor according to claim 1, wherein the mounting points are arranged transversely of the tire so that both mounting points enter the contact patch at the same time and the flattening of the tread curvature is sensed laterally of the tire.

7. A tire containing a sensor according to any of claims 1 to 5, wherein the mounting points are arranged longitudinally of the tire so that one mounting point enters the contact patch, then the contact member and finally the second mounting point so that the flattening of the tread curvature is sensed circumferentially of the tire.

8. A sensor according to claim 1, wherein a data storage memory is enclosed in the sensor to allow storage of the signals as data for later interrogation by a sensor external of the tire.

9. A method of counting the rotations at the around contact patch of a pneumatic tire on a vehicle, comprising (a) sensing the changing radius of the tire tread region using a sensor which comprises a piezo-electric device mounted on the inner surface of the tread radius inside the tire under the tread region having two spaced apart mounting points for attachment and an intermediate contact member which is acted upon by the tire when the tire radius is changed at the ground contact patch; (b) providing damping means for the sensor so that a signal is generated only when relative movement between the two occurs rapidly and not for slow movement so that on rotation of the tire on a vehicle a signal is produced each time the tread region to which the sensor is attached enters the contact patch but when the tread radius changes slowly as when there is a pressure change on inflation of the tire the movement is slow and no signal is produced; (c) rotating the tire on the vehicle over the contact patch; and (d) counting the signals from the sensor.

10. A method according to claim 9, wherein the signal is produced when the tire tread region is flattened in the contact patch.

11. A method according to claim 9, wherein the signal is produced only for radially inward movement of the contact point.

\* \* \* \* \*